United States Patent [19]

Midtling et al.

[11] Patent Number: 5,197,263
[45] Date of Patent: Mar. 30, 1993

[54] METHOD AND APPARATUS FOR HARVESTING AQUATIC PLANTS

[75] Inventors: Brian J. Midtling, Glencoe; Lawrence J. DeVore, Minneapolis; Victor V. Sygen, West St. Paul, all of Minn.

[73] Assignee: The Lemna Corporation, Mendota Heights, Minn.

[21] Appl. No.: 759,488

[22] Filed: Sep. 13, 1991

[51] Int. Cl.$^5$ ............................................. A01D 44/00
[52] U.S. Cl. ................................................. 56/8; 56/9; 210/242.3; 210/433.1
[58] Field of Search .................. 56/8, 9; 210/242.1, 210/242.2, 433.1, 456, 242.3

[56] References Cited

U.S. PATENT DOCUMENTS

| | | | |
|---|---|---|---|
| 2,065,733 | 1/1934 | Pearson | 56/8 |
| 2,283,472 | 5/1942 | Tuxhorn | 119/3 |
| 2,330,508 | 9/1943 | McColl | 210/242.3 |
| 3,155,609 | 11/1964 | Pampel | 210/602 |
| 3,363,769 | 1/1968 | Wilmot et al. | 210/433.1 X |
| 3,385,786 | 5/1968 | Klock | 210/602 |
| 3,451,555 | 6/1969 | Ginaven | 210/433.1 |
| 3,456,385 | 7/1969 | Plath | 47/63 |
| 3,546,858 | 12/1970 | Chaplin | 56/9 |
| 3,613,891 | 10/1971 | Cloutier | 210/242.3 |
| 3,653,192 | 4/1972 | Bryant | 56/9 |
| 3,708,070 | 1/1973 | Bell | 210/242.3 |
| 3,760,946 | 9/1973 | Boler | 210/170 |
| 3,839,198 | 10/1974 | Shelef | 210/602 |
| 3,852,378 | 12/1974 | Guida | 261/4 |
| 3,911,514 | 10/1975 | Ito | 441/133 |
| 3,927,491 | 12/1975 | Farnsworth | 47/63 |
| 3,959,923 | 6/1976 | Selke | 47/1.4 |
| 3,966,613 | 6/1976 | Kirk et al. | 210/242.3 |
| 4,133,141 | 1/1979 | Lee | 47/79 |
| 4,151,081 | 4/1979 | Bolli et al. | 210/776 |
| 4,169,050 | 9/1979 | Serfling et al. | 210/602 |
| 4,209,943 | 7/1980 | Moeller et al. | 47/1.4 |
| 4,240,243 | 12/1980 | Deal | 56/8 |
| 4,248,033 | 2/1981 | Bryant | 56/8 |
| 4,265,757 | 5/1981 | Ivanoff | 210/242.3 |
| 4,320,594 | 3/1982 | Raymond | 47/1.4 |
| 4,324,067 | 4/1982 | Kessler | 47/1.4 |
| 4,333,263 | 6/1982 | Adey | 47/1.4 |
| 4,333,837 | 6/1982 | Plosz et al. | 210/602 |
| 4,382,348 | 5/1983 | Kitsu et al. | 47/39 X |
| 4,487,588 | 12/1984 | Lewis, III et al. | 441/43 |
| 4,536,988 | 8/1985 | Hogen | 47/1.5 |
| 4,734,193 | 3/1988 | Cvitas et al. | 210/242.3 |
| 4,738,563 | 4/1988 | Clark | 405/52 |
| 4,747,958 | 5/1988 | Eberhardt | 210/749 |
| 4,779,404 | 10/1988 | Bell | 56/9 |
| 4,795,567 | 1/1989 | Simpson et al. | 210/744 |
| 4,806,251 | 2/1989 | Durda | 210/747 |
| 4,872,985 | 10/1989 | Dinges | 210/602 |
| 5,011,604 | 4/1991 | Wilde et al. | 210/602 |

FOREIGN PATENT DOCUMENTS

| | | | |
|---|---|---|---|
| 241896 | 12/1964 | Austria . | |
| 277905 | 4/1990 | Fed. Rep. of Germany . | |
| 2080107 | 11/1971 | France | 210/242.1 |
| 2239120 | 7/1973 | France . | |
| 2361060 | 8/1977 | France . | |
| 58-70893 | 4/1983 | Japan . | |
| 906455 | 2/1981 | U.S.S.R. . | |
| 1428263 | 10/1988 | U.S.S.R. | 56/9 |
| 1373035 | 11/1974 | United Kingdom . | |

OTHER PUBLICATIONS

*Mud Cat In Action,* National Car Rental System, Inc., Public Works, Dec. 1981.
*Aerated Lagoon Systems With Improved Performance,* Linvil G. Rich, WATER/Engineering & Management, Feb. 1982.
*A Low-Cost Secondary Treatment Alternative,* Linvil G. Rich, WATER/Engineering & Management, Feb. 1982.

Primary Examiner—David J. Bagnell
Attorney, Agent, or Firm—Kinney & Lange

[57] ABSTRACT

A duckweed slurry is recovered from a body of water. The duckweed slurry includes duckweed and water from the body of water. The duckweed slurry is transported to a dewatering station. A majority of the water from the duckweed slurry is removed at the dewatering station. Water removed from the duckweed slurry is returned to the body of water.

28 Claims, 2 Drawing Sheets

METHOD AND APPARATUS FOR HARVESTING AQUATIC PLANTS

BACKGROUND OF THE INVENTION

The present invention relates to aquatic plants. More particularly, the present invention relates to a system for harvesting duckweed from a body of water.

There has been an increasing interest in the use of aquatic plants as a food source or cash crop. Additionally, aquatic plants have found use in waste water treatment.

Growing and harvesting aquatic plants has become an increasingly important industry. Improving the efficiency of growth and harvest techniques is an important factor in continued expansion in the industry of aquatic plant production. U.S. Pat. No. 4,536,998 describes a system of growing aquatic plants which increases yield and the effectiveness of those plants for waste water treatment. Continued improvement of harvesting techniques is important to continued industry growth.

Aquatic plants, such as duckweed, grow near the surface of bodies of water, and tend to have a rather large volume relative to their weight, i.e., a relatively low density. However, duckweed can take on a variety of forms depending on many factors, including its life cycle stage, density and root length. In order to harvest the plant, a harvesting device must be suited to lift the duckweed in densities ranging from a thin "monolayer" approximately 1/10 of an inch thick, to a 1"–4" thick semi-solid mat of duckweed with the consistency of mud. In the "mono-layer" state, the duckweed disburses to fill gaps on the water surface. In the "semi-solid" state, the duckweed adheres to itself resisting separation.

In the past, conveyor belt lifting systems and other such transportation mechanisms were used to transport duckweed from a pond to its final destination. Such mechanisms were sub-optimal because they resulted in poor dewatering and they were expensive and large. Thus, they were difficult to move from one site to another.

SUMMARY OF THE INVENTION

The present invention is a smaller dewatering system capable of being moved more easily. In addition, the present system provides much improved dewatering and handling of the duckweed.

A duckweed slurry is recovered from a pond surface. The duckweed slurry is pumped from the pond to a dewatering station. A majority of the water is removed from the duckweed slurry at the dewatering station and the water removed from the duckweed slurry is returned to the pond.

DETAILED DESCRIPTION OF THE PREFERRED EMBODIMENTS

Figure 1:
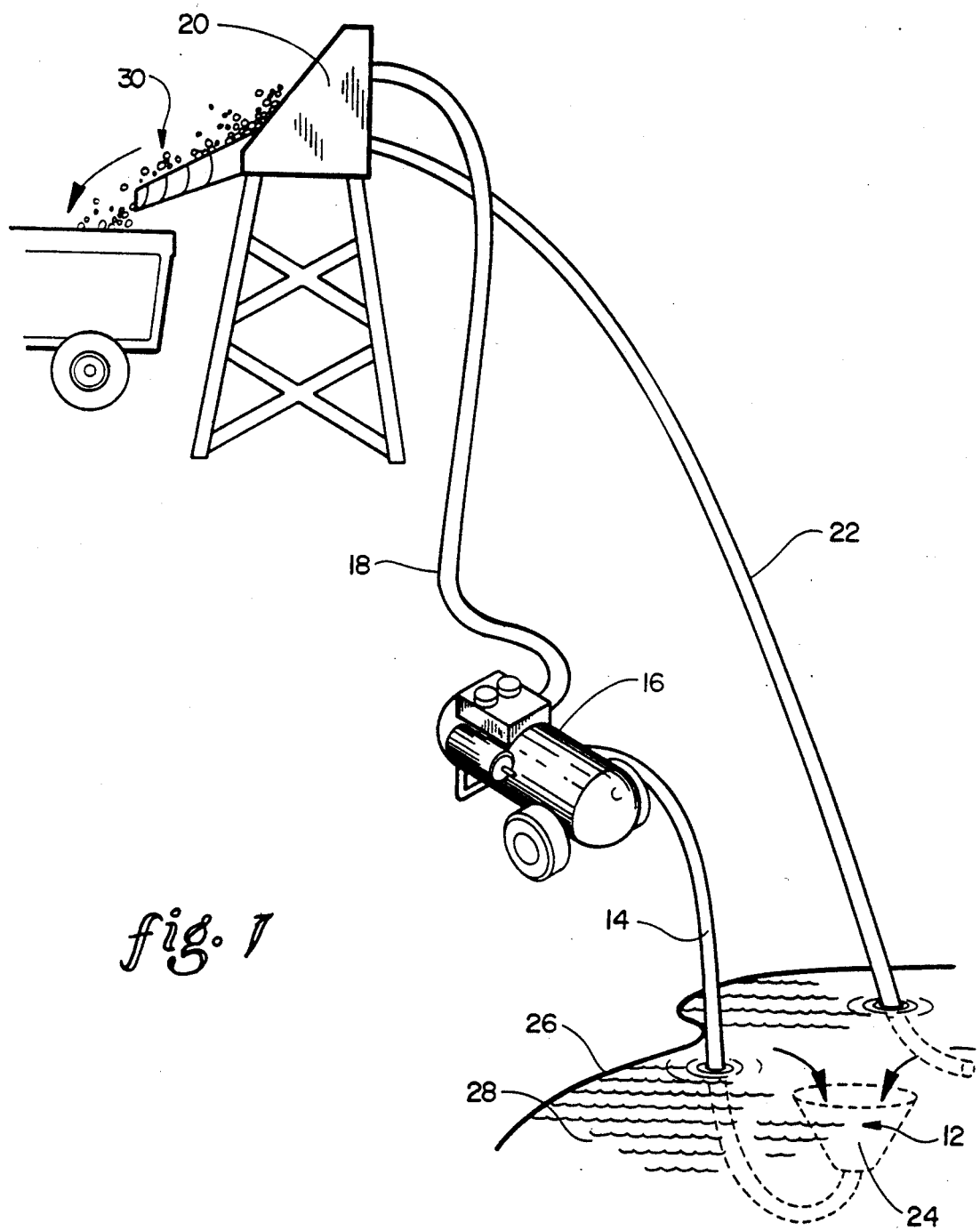
FIG. 1 shows a dewatering system of the present invention.

FIG. 1 shows a duckweed delivery and dewatering system 10 (dewatering system 10) according to the present invention. Dewatering system 10 includes a feed head 12, suction hose 14, pump 16, pumping hose 18, dewatering station 20 and return hose 22. Feed head 12, in this preferred embodiment, has an inlet defined by a generally funnel shaped mixing chamber 24. Feed head 12 is located beneath the surface of a pond 26 which has a mat of duckweed 28 floating on its surface. The inlet of feed head 12 is located just beneath the surface of pond 26, so that the duckweed floating on the surface, as well as some of the water from pond 26 enters feed head 12 in a duckweed slurry.

The duckweed slurry falls into hose 14. Pump 16 generates suction in hose 14 to move the duckweed slurry through hose 14 to pump 16. Pump 16 then pumps the duckweed slurry into hose 18 and into dewatering station 20.

A majority of the water in the duckweed slurry is removed from the slurry in dewatering station 20 and returned to pond 26 through hose 22. The duckweed remaining after the dewatering process, designated generally by numeral 30, can then be removed from the dewatering station 20 by a variety of means. For example, a containment bin can be provided near the dewatering station for containing the duckweed. The containment bin can be a composting bin, a drying area, or a bin which is loadable onto a truck or trailer bed for removal from the dewatering site.

Figure 2:
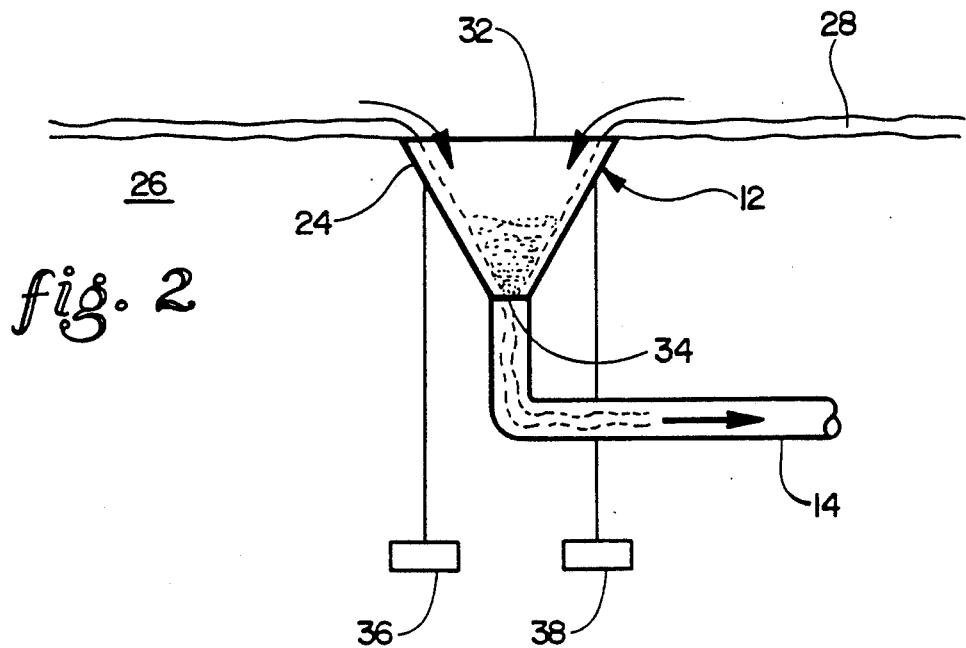
FIG. 2 is a more detailed diagram of a feed head of the present invention.

FIG. 2 is a more detailed drawing of feed head 12. Feed head 12 includes generally funnel shaped mixing chamber 24 which has an inlet 32 at its upper end and an outlet 34 at its lower end. Outlet 34 is attached to hose 14. Feed head 12 also includes weights 36 and 38 which are attached to the generally funnel shaped mixing chamber 24.

The duckweed 28 typically forms a mat at the surface of pond 26. The inlet 32 of feed head 12 is positioned, through the use of weights 36 and 38, just under the surface of pond 26 so that it allows a duckweed slurry which includes the duckweed 28 and water from the pond 26 to enter feed head 12. The duckweed mat on the surface of pond 26 can have different thicknesses depending on the length of time since the previous harvest. Therefore, feed head 12 is adjustable so that the depth at which it is located under the surface of pond 26 can be varied. In this embodiment, weights 36 and 38 are removable and different weights can be attached to mixing chamber 24. Thus, the distance that the inlet 32 of the mixing chamber 24 is located from the surface of pond 26 can be adjusted depending on the thickness of the duckweed 28 on the surface of pond 26.

Suction hose 14, attached to the outlet 34 of mixing chamber 24, creates a vacuum effect at the inlet 32 of mixing chamber 24. As the duckweed slurry flows over the top of mixing chamber 24 through inlet 32, it gains momentum as it falls toward outlet 34. The duckweed 28 mixes with the water from pond 26 due to the turbulence in mixing chamber 24. This results in a more consistent slurry, ready for processing through the rest of system 10. In this preferred embodiment, inlet 32 of mixing chamber 24 is approximately 12–15 inches in diameter. However, it should be noted that the size of feed head 12 can be varied to fit the needs of any particular harvesting system.

After the duckweed slurry leaves outlet 34 of mixing chamber 24, it enters suction hose 14. Suction hose 14 is, in this preferred embodiment, a non-collapsible hose of sufficient length to reach the on-shore pump 16. A typical length is approximately 15–30 feet. Suction hose 14 is of sufficient diameter to allow throughput of the duckweed slurry as required by the size of the pond and the harvesting conditions. A typical diameter for suction hose 14 is approximately 3–4 inches.

Suction hose 14 is coupled to pump 16. Pump 16 is a trash type pump with sufficient throughput to pump the duckweed slurry from the pond 26 to dewatering station 20. The pump size will vary with the size of the pond and other harvesting conditions such as mat thickness, and the distance and elevation between the pond 26 and dewatering station 20.

The pump 16 creates enough suction to lift the duckweed slurry from the pond surface to pump 16 and enough output to lift the slurry from pump 16 to dewatering station 20. Typical heights that pump 16 will be moving the duckweed slurry are, in this preferred embodiment, 10 feet from the surface of pond 26 to pump 16 and 15 feet from pump 16 to dewatering station 20. Pump 16 can be powered with any suitable means including gasoline, diesel fuel, electricity, or compressed air, depending on the harvesting site requirements. In this preferred embodiment, pump 16 is a lightweight aluminum pump capable of being coupled to a three inch hose and capable of pumping up to 22,000 gallons per hour. Such a pump is commercially available as a 3100 series pump from B&S Wisconsin, Kohler, Robin Engines or Lister Diesel. The pump is capable of pumping $\frac{1}{4}$ inch solids.

The pumping hose 18 is also, preferably, a non-collapsible hose having sufficient length to reach from pump 16 to dewatering station 20. A typical length is 20 to 50 feet. Pumping hose 18 transports the duckweed slurry from pump 16 to dewatering station 20 and should have sufficient diameter to allow throughput as required by the size of pond 26 and other harvesting conditions, including the mat thickness. A typical diameter is 3–4 inches.

Figure 3:
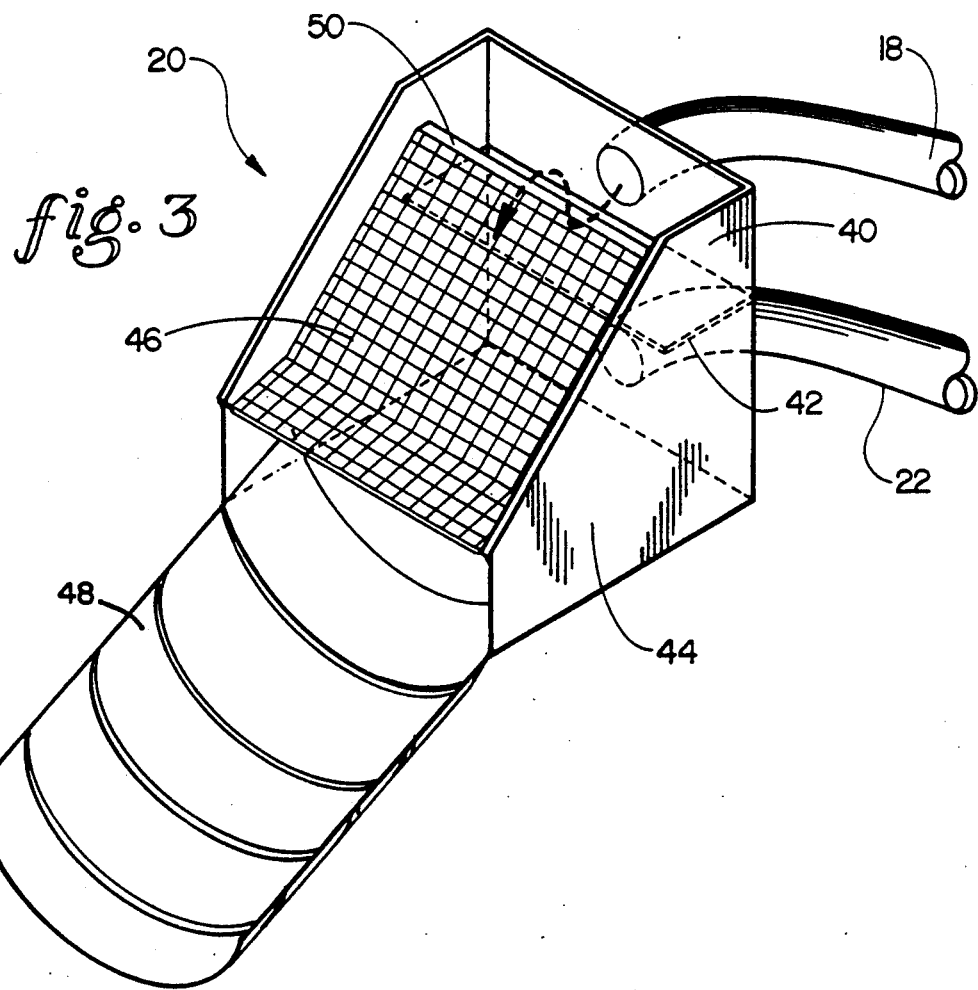
FIG. 3 is a more detailed drawing of a dewatering station of the present invention.

FIG. 3 is a more detailed diagram of dewatering station 20. Dewatering station 20 includes a housing 40 which houses an input reservoir (shown in phantom in FIG. 3) which is coupled to pumping hose 18. Housing 40 also defines an output reservoir 44 which is coupled to return hose 22. A screen 46 is coupled, within housing 40, to an upper portion of input reservoir 42. Screen 46 is tilted at an angle and extends substantially within housing 40 to a lower portion of housing 40 where it is attached to a directional output chute 48.

In operation, the duckweed slurry is pumped through pump output hose 18 into input reservoir 42. Input reservoir 42 fills with the duckweed slurry until the duckweed slurry begins spilling over an edge 50 of the input reservoir onto screen 46. It should be noted that the edges of housing 40 extend past edge 50 of input reservoir 42 so that spillage of the duckweed slurry is contained and directed over screen 46.

As the duckweed slurry spills over edge 50, it is drawn by gravitational force, and by the force of additional spillage of duckweed slurry over edge 50, down screen 46 towards directional chute 48. Screen 46 has openings and wire sizes sufficient to screen the duckweed from the duckweed slurry. As the slurry moves down tilted screen 46, the water falls through screen 46 and enters output reservoir 44. Meanwhile, the duckweed does not pass through screen 46 but continues to travel down screen 46 to directional chute 48. Directional chute 48 can be repositioned in various directions to direct the duckweed to its destination. The duckweed can be directed into a composting bin or a drying area or any number of other suitable destinations.

The water which enters the output reservoir 44 exits the output reservoir 44 through return hose 22. In this preferred embodiment, return hose 22 is a non-collapsible hose of sufficient length to reach from the dewatering station 20 back to pond 26. A typical length for return hose 22 is on the order of 20–50 feet. The hose transports the water component of the duckweed slurry back to pond 26 and must be of sufficient diameter to allow throughput as required by the pond size and the slurry consistency. A typical diameter is approximately 3–4 inches.

In one preferred embodiment, screen 46 has openings and wire sizes which vary across the width of screen 46. This allows varying degrees of dewatering to occur across the width of screen 46. The variously dewatered duckweed can be directed by a plurality of directional chutes into different final destinations, depending on its degree of dewatering. It should also be noted, that screen 46 is typically an 8 by 8 inch wire mesh (i.e., 8 wires per inch in either direction).

Thus, the harvesting and dewatering system of the present invention is smaller and is therefore more easily moved between sites than the systems of the prior art. Further, the dewatering provided is less expensive and better quality.

Although the present invention has been described with reference to preferred embodiments, workers skilled in the art will recognize that changes may be made in form and detail without departing from the spirit and scope of the invention.

What is claimed is:

1. A method of harvesting duckweed from a body of water, the method comprising:
    recovering a duckweed slurry from the body of water by adjusting a feed head having a mixing chamber, the feed head being proximate the surface of the body of water so duckweed from the surface of the body of water, and water from the body of water flow into the feed head and the mixing chamber, producing the duckweed slurry comprising duckweed and water from the body of water;
    transporting the duckweed slurry to a land-based dewatering station;
    removing a majority of the water from the duckweed slurry at the dewatering station; and
    returning the water removed from the duckweed slurry to the body of water.

2. The method of claim 1 wherein the step of transporting the duckweed slurry comprises:
    pumping the duckweed slurry from the feed head to the land-based dewatering station.

3. The method of claim 1 wherein the step of removing a majority of the water from the duckweed slurry comprises:
    causing the duckweed slurry to move over a screen so that water from the slurry passes through the screen while substantially all of the duckweed is retained by the screen.

4. The method of claim 3 wherein the step of returning the water comprises:
    providing a return flow path, beginning below the screen, so the water that passes through the screen flows along the return flow path to the body of water.

5. The method of claim 1 and further comprising:

removing the duckweed from the dewatering station; and collecting the duckweed.

6. The method of claim 5 wherein the step of removing the duckweed comprises:
providing a directional chute for directing duckweed removal from the dewatering station and to a collection location.

7. A method of harvesting duckweed from a body of water, the method comprising:
recovering a duckweed slurry, comprising duckweed and water, from the body of water wherein the step of recovering a duckweed slurry comprises:
adjusting a feed head having a mixing chamber, the feed head being proximate the surface of the body of water so duckweed from the surface of the body of water, and water from the body of water flow into the feed head and the mixing chamber;
pumping the duckweed slurry to a land-based dewatering station; and
removing a majority of the water from the duckweed slurry at the land-based dewatering station.

8. The method of claim 7 and further comprising:
returning the water removed from the duckweed slurry to the body of water.

9. The method of claim 7 wherein the step of pumping the duckweed slurry comprises:
pumping the duckweed slurry from the feed head to the land-based dewatering station.

10. The method of claim 7 wherein the step of removing a majority of the water from the duckweed slurry comprises:
causing the duckweed slurry to move over a screen so that water from the slurry passes through the screen while substantially all of the duckweed is retained by the screen.

11. The method of claim 7 and further comprising:
removing the duckweed from the dewatering station; and collecting the duckweed.

12. The method of claim 11 wherein the step of removing the duckweed comprises:
providing a directional chute for directing duckweed removal from the dewatering station and to a collection location.

13. An apparatus for harvesting duckweed from a pond, comprising:
recovering means for recovering a duckweed slurry from the pond, the duckweed slurry comprising duckweed and water from the pond, the recovering means comprising:
an adjustable feed head having a mixing chamber, the feed head being adjustable to various depths proximate the surface of the pond, and positioned under the surface of the pond so duckweed from the surface of the pond and water from the pond flow into the feed head;
a land-based dewatering station for removing a majority of the water from the duckweed slurry;
pumping means, coupled to the recovering means and the land-based dewatering station, for pumping the duckweed slurry from the recovering means to the dewatering station; and
means for returning the water removed from the duckweed slurry to the pond.

14. The apparatus of claim 13 wherein the mixing chamber includes:
an inlet opening toward the surface of the pond and an outlet coupled to the pumping means; and
wherein the adjustable feed head further comprises:
adjustable means for variably holding the inlet of the mixing chamber a predetermined distance below the surface of the pond.

15. The apparatus of claim 14 wherein the pumping means comprises:
a first hose coupled to the outlet of the mixing chamber and sized to permit passage of the duckweed slurry through the first hose;
a pump, coupled to the first hose, for drawing the duckweed slurry from the outlet of the mixing chamber through the first hose; and
a second hose, coupled to the pump and the land-based dewatering station and sized to permit passage of the duckweed slurry through the second hose, the pump being coupled to pump the duckweed slurry from the mixing chamber through the first hose and to the land-based dewatering station through the second hose.

16. The apparatus of claim 13 wherein the land-based dewatering station comprises:
a screen, coupled to the pumping means so that the duckweed slurry pumped by the pumping means passes over the screen and water from the slurry passes through the screen while substantially all of the duckweed is retained by the screen.

17. The apparatus of claim 16 wherein the land-based dewatering station further comprises:
an input reservoir having an inlet portion coupled to the pumping means for receiving the duckweed slurry, and an outlet portion, the screen being mounted proximate the outlet portion of the input reservoir and tilted downwardly from the outlet portion so that the duckweed slurry exiting the outlet portion of the input reservoir moves along the screen aided by gravitational force; and
an output reservoir below the screen located relative to the screen so that water passing through the screen enters the output reservoir.

18. The apparatus of claim 17 wherein the means for returning the water comprises:
a hose coupled to the output reservoir and providing a return flow path so the water that passes through the screen flows along the return flow path to the pond.

19. The apparatus of claim 13 and further comprising:
means for removing the duckweed from the dewatering station; and
means for collecting the duckweed.

20. The apparatus of claim 19 wherein the means for removing the duckweed comprises:
a directional chute for directing duckweed remaining after water is removed from the duckweed slurry for removal from the land-based dewatering station and to a collection location.

21. A method of harvesting aquatic vegetation from a body of water, the method comprising:
recovering an aquatic vegetation slurry, comprising aquatic vegetation and water, from the body of water wherein the step of recovering an aquatic vegetation slurry comprises:
adjusting a feed head having a mixing chamber, the feed head being proximate the surface of the body of water so aquatic vegetation from the surface of the body of water, and water from the body of water flow into the feed head and the mixing chamber;

pumping the aquatic vegetation slurry to a land-based dewatering station; and removing a majority of the water from the aquatic vegetation slurry at the land-based dewatering station.

22. The method of claim 21 wherein the step of removing a majority of the water from the aquatic vegetation slurry comprises:

causing the aquatic vegetation slurry to move over a screen so that water from the slurry passes through the screen while substantially all of the aquatic vegetation is retained by the screen.

23. The method of claim 21 and further comprising:

removing the aquatic vegetation from the dewatering station; and collecting the aquatic vegetation.

24. An apparatus for harvesting aquatic vegetation from a pond, comprising:

recovering means for recovering an aquatic vegetation slurry form the pond, the aquatic vegetation slurry comprising aquatic vegetation and water from the pond, the recovering means comprising:

an adjustable feed head having a mixing chamber, the feed head being adjustable to various depths proximate the surface of the pond, and positioned under the surface of the pond so aquatic vegetation from the surface of the pond and water from the pond flow into the feed head;

a land-based dewatering station for removing a majority of the water from the aquatic vegetation slurry;

pumping means, coupled to the recovering means and the land-based dewatering station, for pumping the aquatic vegetation slurry from the recovering means to the dewatering station; and means for returning the water removed from the aquatic vegetation slurry to the pond.

25. The apparatus of claim 24 wherein the mixing chamber further includes:

an inlet opening toward the surface of the pond and an outlet coupled to the pumping means; and wherein the adjustable feed head further comprises:

adjustable means for variably holding the inlet of the mixing chamber a predetermined distance below the surface of the pond.

26. The apparatus of claim 24 wherein the land-based dewatering station comprises:

a screen, coupled to the pumping means so that the aquatic vegetation slurry pumped by the pumping means passes over the screen and water from the slurry passes through the screen while substantially all of the aquatic vegetation is retained by the screen.

27. The apparatus of claim 24 wherein the land-based dewatering station further comprises:

an input reservoir having an inlet portion coupled to the pumping means for receiving the aquatic vegetation slurry, and an outlet portion, the screen being mounted proximate the outlet portion of the input reservoir and tilted downwardly from the outlet portion so that the aquatic vegetation slurry exiting the outlet portion of the input reservoir moves along the screen aided by gravitational force; and an output reservoir below the screen located relative to the screen so that water passing through the screen enters the output reservoir.

28. The apparatus of claim 24 wherein and further comprising:

means for removing the aquatic vegetation from the dewatering station; and means for collecting the aquatic vegetation.

* * * * *